(12) United States Patent
Wang et al.

(10) Patent No.: US 10,575,169 B2
(45) Date of Patent: Feb. 25, 2020

(54) INFORMATION PROCESSING METHOD AND DEVICE

(71) Applicant: Beijing Zhigu Rui Tuo Tech Co., Ltd., Beijing (CN)

(72) Inventors: Zhengxiang Wang, Beijing (CN); Jian Wang, Changchun (CN); Haifeng Zhu, Changchun (CN)

(73) Assignee: BEIJING ZHIGU RUI TUO TECH CO., LTD., Beijing (CN)

( * ) Notice: Subject to any disclaimer, the term of this patent is extended or adjusted under 35 U.S.C. 154(b) by 178 days.

(21) Appl. No.: 15/284,672

(22) Filed: Oct. 4, 2016

(65) Prior Publication Data

US 2017/0156054 A1     Jun. 1, 2017

(30) Foreign Application Priority Data

Nov. 30, 2015 (CN) .......................... 2015 1 0857429

(51) Int. Cl.
| | | |
|---|---|---|
| *H04W 12/02* | (2009.01) | |
| *H04W 4/02* | (2018.01) | |
| *H04W 4/21* | (2018.01) | |
| *G06Q 50/00* | (2012.01) | |
| *H04L 9/08* | (2006.01) | |
| *H04W 12/04* | (2009.01) | |

(52) U.S. Cl.
CPC ............ *H04W 12/02* (2013.01); *G06Q 50/01* (2013.01); *H04L 9/0861* (2013.01); *H04W 4/027* (2013.01); *H04W 4/21* (2018.02); *H04W 12/04* (2013.01); *H04L 2209/601* (2013.01); *H04L 2209/80* (2013.01)

(58) Field of Classification Search
CPC ...................................................... H04W 12/02
USPC ........................................................ 380/270
See application file for complete search history.

(56) References Cited

U.S. PATENT DOCUMENTS

| | | | |
|---|---|---|---|
| 9,544,351 B1* | 1/2017 | Lee ......................... | H04L 65/608 |
| 2010/0153175 A1* | 6/2010 | Pearson ................. | G06Q 10/10 705/319 |
| 2010/0174747 A1* | 7/2010 | Farrell .................... | G06Q 30/02 707/776 |
| 2013/0091582 A1* | 4/2013 | Chen ....................... | G06Q 10/10 726/26 |

(Continued)

FOREIGN PATENT DOCUMENTS

| | | |
|---|---|---|
| CN | 102624917 A | 8/2012 |
| CN | 103825903 A | 5/2014 |
| CN | 104125228 A | 10/2014 |

*Primary Examiner* — Peter C Shaw
(74) *Attorney, Agent, or Firm* — Sheppard Mullin Richter & Hampton LLP (57) ABSTRACT

The present application provides an information processing method and device, and relates to the field of information encryption and decryption. The method comprises: sharing first information on a social network; generating a key according to the first information; encrypting second information by using the key, to obtain encrypted information; and wirelessly broadcasting the encrypted information. According to the method, persons in a coverage area of the wireless broadcast all can receive the encrypted information, but only a person having a permission to access the first information on the social network can decrypt the encrypted information. Therefore, it is convenient and secure for a user to broadcast information to friends around and the like.

21 Claims, 5 Drawing Sheets

(56) References Cited

U.S. PATENT DOCUMENTS

| | | | |
|---|---|---|---|
| 2013/0198274 A1* | 8/2013 | Papakipos | H04W 76/11 |
| | | | 709/204 |
| 2013/0198383 A1* | 8/2013 | Tseng | H04L 63/102 |
| | | | 709/225 |
| 2013/0298030 A1* | 11/2013 | Nahumi | H04W 4/04 |
| | | | 715/733 |
| 2015/0046267 A1* | 2/2015 | MacTiernan | H04L 51/32 |
| | | | 705/14.66 |
| 2015/0222606 A1 | 8/2015 | Yan | |
| 2015/0358415 A1* | 12/2015 | Cronin | H04L 67/22 |
| | | | 709/217 |
| 2016/0044006 A1* | 2/2016 | Luft | H04W 36/22 |
| | | | 380/270 |
| 2018/0310035 A1* | 10/2018 | Kawamae | H04N 19/46 |
| 2019/0087432 A1* | 3/2019 | Sion | G06F 21/62 |

\* cited by examiner

INFORMATION PROCESSING METHOD AND DEVICE

TECHNICAL FIELD

The present application relates to the technical field of information encryption and decryption, and in particular, to an information processing method and device.

BACKGROUND

With the development of the internet of vehicles technology and industry, a conventional definition of the internet of vehicles already cannot encompass all content of the internet of vehicles. As defined by the internet of vehicles industry technology innovation strategic alliance, the internet of vehicles is a large-scale system network in which wireless communication and information exchange are performed between a vehicle and X (X: vehicle, road, pedestrian, Internet, and the like) on the basis of an intra-vehicle network, an inter-vehicle network, and a vehicle-mounted mobile internet according to an agreed communications protocol and data exchange standard.

A social network is a social virtual platform that is well known and widely used by people. People are used to sharing their information on the social network and viewing information shared by friends.

In real life, when a user goes on a tour with multiple friends by drive, the user may share some interesting content, for example, a funny video, with another friend by using a vehicle-mounted antenna. In this case, the content shared by the user may be received by a stranger around, which is not expected by the user.

SUMMARY

An objective of the present application is to provide an information processing method and device, to cause information to be securely and conveniently shared between particular users.

According to a first aspect of at least one embodiment of the present application, an information processing method is provided, wherein the method comprises:
sharing first information on a social network;
generating a key according to the first information;
encrypting second information by using the key, to obtain encrypted information; and
wirelessly broadcasting the encrypted information.

According to a second aspect of at least one embodiment of the present application, an information processing method is provided, wherein the method comprises:
wirelessly receiving encrypted information;
obtaining first information from a social network;
generating a key according to the first information; and
decrypting the encrypted information by using the key.

According to a third aspect of at least one embodiment of the present application, an information processing device is provided, wherein the device comprises:
a sharing module, configured to share first information on a social network;
a generation module, configured to generate a key according to the first information;
an encryption module, configured to encrypt second information by using the key, to obtain encrypted information; and
a broadcast module, configured to wirelessly broadcast the encrypted information.

According to a fourth aspect of at least one embodiment of the present application, an information processing device is provided, wherein the device comprises:
a receiving module, configured to wireless receive encrypted information;
an obtaining module, configured to obtain first information from a social network;
a generation module, configured to generate a key according to the first information; and
a decryption module, configured to decrypt the encrypted information by using the key.

According to a fifth aspect of at least one embodiment of the present application, a user equipment is provided, wherein the user equipment comprises:
a memory, configured to store an instruction; and
a processor, configured to execute the instruction stored in the memory, wherein the instruction causes the processor to execute the following operations:
sharing first information on a social network;
generating a key according to the first information;
encrypting second information by using the key, to obtain encrypted information; and
wirelessly broadcasting the encrypted information.

According to a sixth aspect of at least one embodiment of the present application, a user equipment is provided, wherein the user equipment comprises:
a memory, configured to store an instruction; and
a processor, configured to execute the instruction stored in the memory, wherein the instruction causes the processor to execute the following operations:
wirelessly receiving encrypted information;
obtaining first information from a social network;
generating a key according to the first information; and
decrypting the encrypted information by using the key.

According to the method and device in embodiments of the present application, encrypted information wirelessly broadcast by a sending user can be received by multiple receiving users around, but only a friend or a neighbor at a pre-determined quantity of hops of the sending user can decrypt the encrypted information. Therefore, information can be securely and conveniently shared between particular users.

DETAILED DESCRIPTION

Specific implementing manners of the present application are further described in detail below with reference to the accompanying drawings and embodiments. The following embodiments are intended to describe the present application, but not to limit the scope of the present application.

A person skilled in the art understands that, in the embodiments of the present application, sequence numbers of the following steps do not mean an execution order, the execution order of the steps should be determined according to their functions and internal logic, and shall not be construed as a limitation to implementation processes of the embodiments of the present application.

Figure 1:
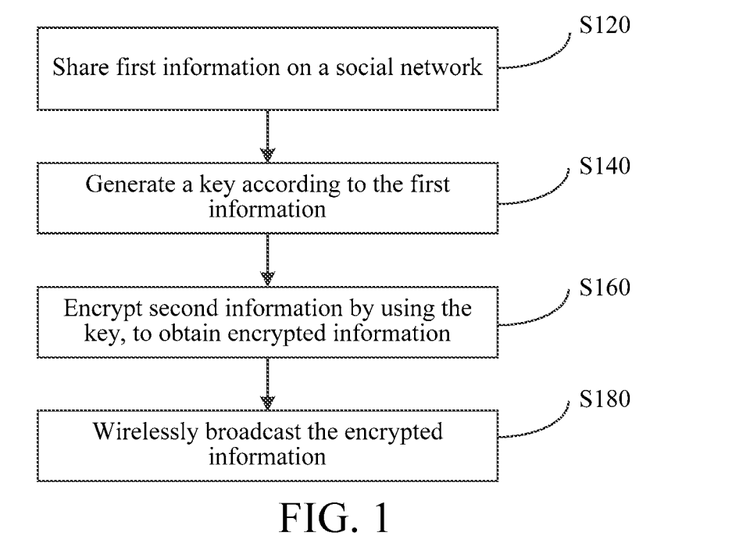
FIG. 1 is a flowchart of an information processing method according to an embodiment of the present application.

FIG. 1 is a flowchart of an information processing method according to an embodiment of the present application. The method may be implemented on, for example, an information processing device. As shown in FIG. 1, the method comprises:

S120: Share first information on a social network.

S140: Generate a key according to the first information.

S160: Encrypt second information by using the key, to obtain encrypted information.

S180: Wirelessly broadcast the encrypted information.

According to the method in this embodiment of the present application, first, first information is shared on a social network and a key is generated according to the first information; and then second information is encrypted by using the key, to obtain encrypted information, and the encrypted information is wirelessly broadcast. According to the method, persons in a coverage area of the wireless broadcast all can receive the encrypted information, but only a person having a permission to access the first information on the social network can decrypt the encrypted information. Therefore, it is convenient and secure for a user to broadcast information to friends around and the like.

Functions of steps S120, S140, S160, and S180 are described below in detail by using specific implementing manners.

S120: Share first information on a social network.

The social network may be, for example, any network social platform on which information can be shared, such as Microblog, Wechat, Renren, Kaixin, or Facebook.

In an implementing manner, the first information can be accessed by a friend or a neighbor at a pre-determined quantity of hops on the social network. The friend or the neighbor at a pre-determined quantity of hops herein refers to a friend or a neighbor at a pre-determined quantity of hops of a user sharing the first information. The user sharing the first information herein is a user subsequently sending encrypted information, and both of them are referred to as a sending user below. In this implementing manner, once the first information is shared on the social network, according to a default setting of the social network, the first information can be accessed by a corresponding friend or neighbor at a pre-determined quantity of hops. The neighbor at a pre-determined quantity of hops herein refers to another user that does not have a direct friend relationship with the user. For example, A and B are in a friend relationship, and A and B are one-hop neighbors of each other; B and C are in a friend relationship, and B and C are one-hop neighbors of each other; and A and C are not in a friend relationship, and A and C are two-hop neighbors of each other. Further, if C and D are in a friend relationship and A, B, and D are not in a friend relationship, A and D are three-hop neighbors of each other. The pre-determined quantity of hops may be set as required, for example, may be set to two hops, to cause that a friend of the friend of the sending user can also decrypt the encrypted information sent by the sending user.

In another implementing manner, the method may further comprise:

S130: Set an access permission of the first information on the social network.

As the access permission of the first information is set, the user can more flexibly control a sharing range of the first information, and further control a receiving user group that can decrypt the encrypted information.

The first information theoretically may be any information, for example, a string of digits, a speech, or a text. In addition, considering a sharing habit of the user, in an implementing manner, the method further comprises:

S110: Obtain first attribute information related to a user as the first information.

The first attribute information may be any attribute information related to the user. Specifically, the first attribute information may be attribute information of the user, or may be attribute information of any object related to the user. The attribute information of the user may be, for example, the height, weight, or location of the user. The any object related to the user may be, for example, a car or a mobile phone of the user. The attribute information of the any object may be, for example, the location, brand, fuel stock or of the car.

In an implementing manner, to further improve security of the encrypted information, the first attribute information is dynamic information of the user or dynamic information of a mobile device of the user. Correspondingly, the method further comprises:

S190: Update the first attribute information on the social network after a pre-determined time.

The dynamic information refers to status information that constantly changes within a short time. For example, the dynamic information may be defined as status information that changes more than once within a threshold time (for example, an hour).

The dynamic information of the user may be a mood or health data of the user. The mood may be, for example, joy, anger, sorrow, or happiness of the user. For example, when the user watches a movie or a teleplay, the mood of the user may change with a plot. The method may be, for example, obtaining a facial expression of the user by using a camera, and obtaining mood information of the user through image recognition. The health data may be, for example, information such as a heart rate, a pulse, an electrocardiogram, or myoelectricity. For example, when the user mountaineers or hikes, the health data of the user fluctuates obviously. For example, the heart rate changes with the intensity of movement. The health data may be obtained by using a corresponding health sensor.

The mobile device may be any device that can move with the user, for example, may be any transportation means of the user such as a vehicle, an aircraft, or a ship, or a portable electronic device of the user such as a smartphone, a smart tablet, or a wearable device. The dynamic information of the mobile device may be, for example, at least one of a location, a speed, and an acceleration of the mobile device. For example, when the user goes on a tour by drive, location, speed, and acceleration information of a vehicle driven by the user may be used as the first information. Information such as the location, speed, and acceleration of the mobile device may be obtained by using a global positioning system (GPS) apparatus and a motion sensor.

Step S190 of updating the first attribute information on the social network is replacing (or covering) old data of the first attribute information with new data. In other words, after the first attribute information is updated, unless a special authorization is obtained, the old data cannot be accessed. For example, it is assumed that the first attribute information is a coordinate location of a car driven by the user during a tour. At a first moment, the coordinate location of the car is (E114°42', N25°26'), and the user shares the coordinate location on the social network. An hour later, the coordinate location of the car is (E115°22', N26°16'). The updating the first attribute information is replacing the old coordinate location (E114°42', N25°26') with the new coordinate location (E115°22', N26°16').

Step S190 of updating the first attribute information on the social network after a pre-determined time may be performed by a corresponding device after the pre-determined time passes by means of automatic trigger or by means of trigger by the user, for example, after the pre-determined time passes, the user is reminded to execute the update operation.

The first attribute information is regularly updated, which limits an effective decryption time of the encrypted information to some extent. After more time passes than the pre-determined time, because the first attribute information has been updated, the encrypted information cannot be decrypted by using a key generated according to the first attribute information after the update. Therefore, security of the encrypted information can be improved.

S140: Generate a key according to the first information.

In this step, the key may be generated according to a key generation rule and the first information. For example, if the first information is a coordinate location (E114°42', N25°26'), the key may be a corresponding character string E11442N2526. For another example, if the first information is a text of Chinese characters, a string of pinyin symbols corresponding to the text of Chinese characters may be used as the key.

S160: Encrypt second information by using the key, to obtain encrypted information.

The second information is information that the user wants to share with a friend around, and may be, for example, a video, a recording, or a picture in a tour.

Herein, the second information is encrypted by using the key, and any existing encryption algorithm, for example, an algorithm such as a data encryption standard (DES), a 3DES, an advanced encryption standard (AES), or an RC2, may be used.

S180: Wirelessly broadcast the encrypted information.

In this step, the encrypted information may be wirelessly broadcast by using an antenna. The antenna may be, for example, a vehicle-mounted antenna or an antenna built in a smartphone.

In this wireless broadcast manner, the encrypted information is sent to an area around the user, and the area is related to a radiation range of the antenna. In an implementing manner, if transmit power of the antenna is adjustable, a broadcast range of the encrypted information may be controlled by adjusting the transmit power of the antenna.

In addition, for a receiving user of the encrypted information, to decrypt the encrypted information, in a feasible manner, the receiving user searches the social network for all possible friends or neighbors at a pre-determined quantity of hops, and generate a key according to the pre-determined key generation rule and information shared by each friend or neighbor at a pre-determined quantity of hops, to attempt to decrypt the encrypted information. This manner obviously consumes much time of the receiving user in decryption.

In an implementing manner, to improve a decryption speed of the receiving user, the method may further comprise:

S200: Wireless broadcast second attribute information related to the user.

The second attribute information may be the same as the first attribute information, that is, the two may be information of a same type. However, the second attribute information is wirelessly broadcast to all receiving users directly as a plaintext, in order that a receiving user may reduce a search range on the social network according to the second attribute information.

Therefore, in an implementing manner, the second attribute information is static information of the user or static information of a mobile device of the user. The static information is information that does not change in a long time. For example, the static information may be defined as information that changes less than twice within a threshold time (for example, a month).

Specifically, the static information of the user may be, for example, information such as an identity (ID), a nickname, or an address of the user; and the static information of the mobile device may be, for example, a brand or a model of a smartphone or a license plate number of a car.

Figure 2:
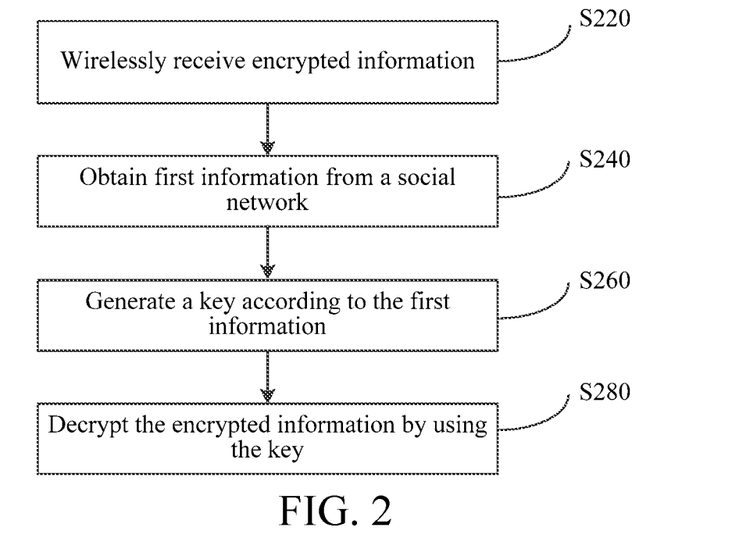
FIG. 2 is a flowchart of an information processing method according to another embodiment of the present application.

FIG. 2 is a flowchart of an information processing method according to another embodiment of the present application. The method may be implemented on, for example, another information processing device. As shown in FIG. 2, the method comprises:

S220: Wirelessly receive encrypted information.

S240: Obtain first information from a social network.

S260: Generate a key according to the first information.

S280: Decrypt the encrypted information by using the key.

According to the method in this embodiment, first, encrypted information is wirelessly received and first information is obtained from a social network; and then a key is generated according to the first information, and the encrypted information is decrypted by using the key. According to the method, the encrypted information can be received by multiple receiving users around a sending user of the encrypted information, and among all the receiving users, only some having an access permission, for example, a friend of the user, can obtain a corresponding key and decrypt the encrypted information. Therefore, information to be shared is conveniently and securely propagated in a corresponding geographic area between multiple close users.

Functions of steps S220, S240, S260, and S280 are described below in detail by using specific implementing manners.

S220: Wirelessly receive encrypted information.

In this step, the encrypted information may be wirelessly received by using an antenna. The antenna may be, for example, a vehicle-mounted antenna or an antenna built in a smartphone of a receiving user.

S240: Obtain first information from a social network.

In this step, the device executing the method may sequentially obtain, on the social network, information shared by each friend or neighbor at a pre-determined quantity of hops of the receiving user as the first information.

The first information theoretically may be any information, for example, a string of digits, a speech, or a text. In addition, considering a sharing habit of a user, in an implementing manner, the first information is first attribute information related to a user, and the user refers to a sending user.

The first attribute information may be any attribute information related to the sending user. Specifically, the first attribute information may be attribute information of the sending user, or may be attribute information of any object related to the sending user. The attribute information of the sending user may be, for example, the height, weight, or location of the sending user. The any object related to the sending user may be, for example, a car or a mobile phone of the sending user. The attribute information of the any object may be, for example, the location, brand, fuel stock or of the car.

In an implementing manner, to further improve security of the encrypted information, the first attribute information is dynamic information of the sending user or dynamic information of a mobile device of the sending user.

The dynamic information refers to status information that constantly changes within a short time. For example, the dynamic information may be defined as status information that changes more than once within a threshold time (for example, an hour).

The dynamic information of the sending user may be a mood or health data of the sending user. The mood may be, for example, joy, anger, sorrow, or happiness of the sending user. The health data may be, for example, information such as a heart rate, a pulse, an electrocardiogram, or myoelectricity.

The mobile device may be any device that can move with the sending user, for example, may be any transportation means of the user such as a vehicle, an aircraft, or a ship, or a portable electronic device of the sending user such as a smartphone, a smart tablet, or a wearable device. The dynamic information of the mobile device may be, for example, at least one of a location, a speed, and an acceleration of the mobile device.

S260: Generate a key according to the first information.

In this step, the key may be generated according to a key generation rule the same as that in step S140 and the first information.

S280: Decrypt the encrypted information by using the key.

In this step, the decryption processing may be completed according to a decryption algorithm corresponding to the encryption processing in step S160. For example, if a DES algorithm is used for encryption in step S160, the DES algorithm is also used for decryption in this step.

After the encrypted information is decrypted, original information sent by the sending user, that is, the second information in the foregoing embodiment, can be obtained.

A person skilled in the art understands that, if a receiving user receives the encrypted information only because the receiving user is around the sending user, because the receiving user is not a friend or a neighbor at a pre-determined quantity of hops of the sending user, the receiving user cannot obtain the key, and cannot decrypt the encrypted information. In other words, only a receiving user that can receive the encrypted information and obtain the key can decrypt the encrypted information.

A person skilled in the art understands that, if there is no other information, a receiving user needs to sequentially search the social network for information shared by each friend or neighbor at a pre-determined quantity of hops, and generate a key according to each piece of shared information to attempt to decrypt the encrypted information, until the decryption succeeds or all shared information is traversed.

This processing manner obviously causes much operation work and consumes much time.

In an implementing manner, the method may further comprise:

S230: Wirelessly receive second attribute information related to the user.

Correspondingly, step S240 further comprises:

S240': Obtain the first information from the social network according to the second attribute information.

The second attribute information may be the same as the first attribute information, that is, the two may be information of a same type. However, the second attribute information is wirelessly broadcast to all receiving users directly as a plaintext, in order that a receiving user may reduce a search range on the social network according to the second attribute information.

Therefore, in an implementing manner, the second attribute information is static information of the sending user or static information of a mobile device of the sending user. The static information is information that does not change in a long time. For example, the static information may be defined as information that changes less than twice within a threshold time (for example, a month).

Specifically, the static information of the sending user may be, for example, information such as an ID, a nickname, or an address of the user; and the static information of the mobile device may be, for example, a brand or a model of a smartphone or a license plate number of a car.

Step S240' of obtaining the first information from the social network according to the second attribute information is using the second attribute information as a filtering condition, filtering out some target objects from the friend or the neighbor at a pre-determined quantity of hops of the receiving user, and then sequentially obtaining information shared by each target object. For example, assuming that the second attribute information is the ID of the sending user on the social network, a unique target object may be directly determined according to the second attribute information, and then information shared by the target object is obtained as the first information, which can obviously improve a processing speed.

In addition, an embodiment of the present application further provides a computer readable medium, comprising a computer readable instruction, wherein when the computer readable instruction is executed, the following operations are performed: operations of steps S120, S140, S160, and S180 of the method in the implementing manner shown in FIG. 1.

An embodiment of the present application further provides another computer readable medium, comprising a computer readable instruction, wherein when the computer readable instruction is executed, the following operations are performed: operations of steps S220, S240, S260, and S280 of the method in the implementing manner shown in FIG. 2.

In conclusion, according to the method in the present application, encrypted information wirelessly broadcast by a sending user can be received by multiple receiving users around, but only a friend or a neighbor at a pre-determined quantity of hops of the sending user can decrypt the encrypted information. Therefore, information can be securely and conveniently shared between particular users.

Figure 3:
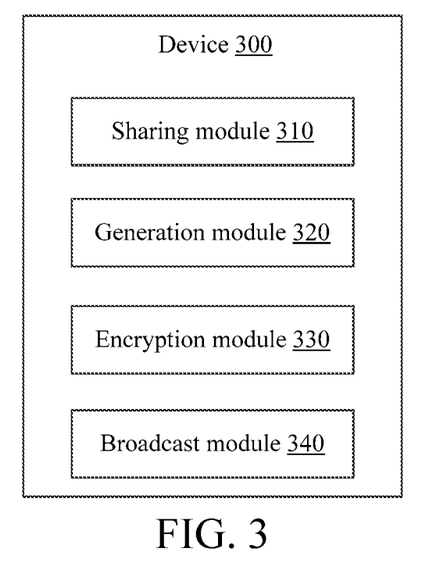
FIG. 3 is a schematic structural diagram of modules of an information processing device according to an embodiment of the present application.

FIG. 3 is a schematic structural diagram of modules of an information processing device according to an embodiment of the present application. The information processing device may be disposed as a function module in a device such as a smartphone, a tablet computer, or a car, or may be an independent device that implements corresponding functions through communication with another electronic device. The device 300 may comprise:

a sharing module 310, configured to share first information on a social network;

a generation module 320, configured to generate a key according to the first information;

an encryption module 330, configured to encrypt second information by using the key, to obtain encrypted information; and a broadcast module 340, configured to wirelessly broadcast the encrypted information.

According to the device in this embodiment of the present application, first, first information is shared on a social network and a key is generated according to the first information; and then second information is encrypted by using the key, to obtain encrypted information, and the encrypted information is wirelessly broadcast. According to the device, persons in a coverage area of the wireless broadcast all can receive the encrypted information, but only a person having a permission to access the first information on the social network can decrypt the encrypted information. Therefore, it is convenient and secure for a user to broadcast information to friends around and the like.

Functions of the sharing module 310, the generation module 320, the encryption module 330, and the broadcast module 340 are described below in detail by using specific implementing manners.

The sharing module 310 is configured to share first information on a social network.

The social network may be, for example, any network social platform on which information can be shared, such as Microblog, Wechat, Renren, Kaixin, or Facebook.

In an implementing manner, the first information can be accessed by a friend or a neighbor at a pre-determined quantity of hops on the social network. The friend or the neighbor at a pre-determined quantity of hops herein refers to a friend or a neighbor at a pre-determined quantity of hops of a user sharing the first information. The user sharing the first information herein is a user subsequently sending encrypted information, and both of them are referred to as a sending user below. In this implementing manner, once the first information is shared on the social network, according to a default setting of the social network, the first information can be accessed by a corresponding friend or neighbor at a pre-determined quantity of hops. The neighbor at a pre-determined quantity of hops herein refers to another user that does not have a direct friend relationship with the user. For example, A and B are in a friend relationship, and A and B are one-hop neighbors of each other; B and C are in a friend relationship, and B and C are one-hop neighbors of each other; and A and C are not in a friend relationship, and A and C are two-hop neighbors of each other. Further, if C and D are in a friend relationship and A, B, and D are not in a friend relationship, A and D are three-hop neighbors of each other. The pre-determined quantity of hops may be set as required, for example, may be set to two hops, to cause that a friend of the friend of the sending user can also decrypt the encrypted information sent by the sending user.

Figure 4:
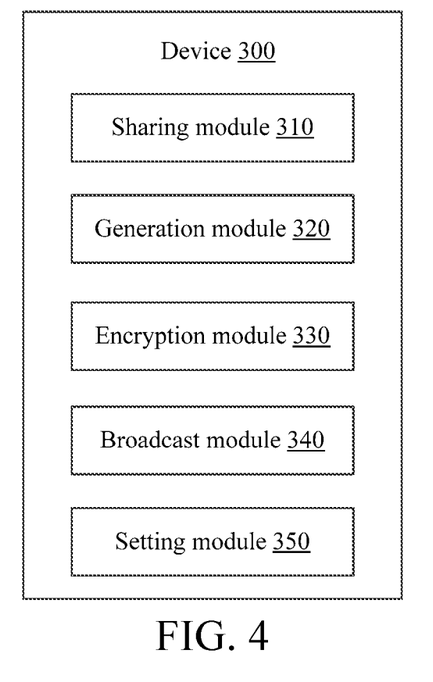
FIG. 4 is a schematic structural diagram of modules of an information processing device according to an implementing manner of the present application.

In another implementing manner, referring to FIG. 4, the device 300 further comprises:

a setting module 350, configured to set an access permission of the first information on the social network.

As the access permission of the first information is set, the user can more flexibly control a sharing range of the first information, and further control a receiving user group that can decrypt the encrypted information.

Figure 5:
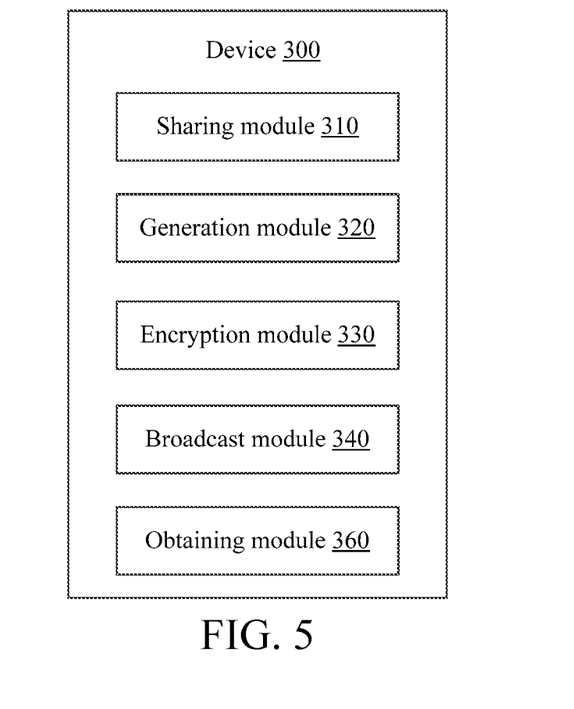
FIG. 5 is a schematic structural diagram of modules of an information processing device according to another implementing manner of the present application.

The first information theoretically may be any information, for example, a string of digits, a speech, or a text. In addition, considering a sharing habit of the user, in an implementing manner, referring to FIG. 5, the device 300 further comprises:

an obtaining module 360, configured to obtain first attribute information related to a user as the first information.

The first attribute information may be any attribute information related to the user. Specifically, the first attribute information may be attribute information of the user, or may be attribute information of any object related to the user. The attribute information of the user may be, for example, the height, weight, or location of the user. The any object related to the user may be, for example, a car or a mobile phone of the user. The attribute information of the any object may be, for example, the location, brand, fuel stock or of the car.

Figure 6:
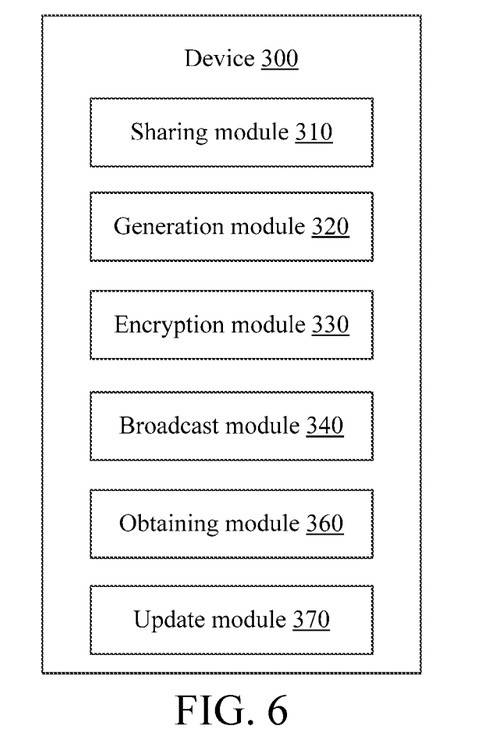
FIG. 6 is a schematic structural diagram of modules of an information processing device according to another implementing manner of the present application.

In an implementing manner, to further improve security of the encrypted information, the first attribute information is dynamic information of the user or dynamic information of a mobile device of the user. Correspondingly, referring to FIG. 6, the device 300 further comprises:

an update module 370, configured to update the first attribute information on the social network after a pre-determined time.

The dynamic information refers to status information that constantly changes within a short time. For example, the dynamic information may be defined as status information that changes more than once within a threshold time (for example, an hour).

The dynamic information of the user may be a mood or health data of the user. The mood may be, for example, joy, anger, sorrow, or happiness of the user. For example, when the user watches a movie or a teleplay, the mood of the user may change with a plot. The device may, for example, obtain a facial expression of the user by using a camera, and obtain mood information of the user through image recognition. The health data may be, for example, information such as a heart rate, a pulse, an electrocardiogram, or myoelectricity. For example, when the user mountaineers or hikes, the health data of the user fluctuates obviously. For example, the heart rate changes with the intensity of movement. The health data may be obtained by using a corresponding health sensor.

The mobile device may be any device that can move with the user, for example, may be any transportation means of the user such as a vehicle, an aircraft, or a ship, or a portable electronic device of the user such as a smartphone, a smart tablet, or a wearable device. The dynamic information of the mobile device may be, for example, at least one of a location, a speed, and an acceleration of the mobile device. For example, when the user goes on a tour by drive, location, speed, and acceleration information of a vehicle driven by the user may be used as the first information. Information such as the location, speed, and acceleration of the mobile device may be obtained by using a GPS apparatus and a motion sensor. In addition, the mobile device may be the information processing device 300, or may be a device that can communicate with the information processing device.

The updating, by the update module 370, the first attribute information on the social network is replacing (or covering) old data of the first attribute information with new data. In other words, after the first attribute information is updated, unless a special authorization is obtained, the old data cannot be accessed. For example, it is assumed that the first attribute information is a coordinate location of a car driven by the user during a tour. At a first moment, the coordinate location of the car is (E114°42', N25°26'), and the user shares the coordinate location on the social network. An hour later, the coordinate location of the car is (E115°22', N26°16'). The updating the first attribute information is replacing the old coordinate location (E114°42', N25°26') with the new coordinate location (E115°22', N26°16').

The updating the first attribute information on the social network after a pre-determined time may be performed by the device after the pre-determined time passes by means of automatic trigger or by means of trigger by the user, for example, after the pre-determined time passes, the user is reminded to execute the update operation.

The first attribute information is regularly updated, which limits an effective decryption time of the encrypted information to some extent. After more time passes than the pre-determined time, because the first attribute information has been updated, the encrypted information cannot be decrypted by using a key generated according to the first attribute information after the update. Therefore, security of the encrypted information can be improved.

The generation module 320 is configured to generate a key according to the first information.

The generation module 320 may generate the key according to a key generation rule and the first information. For example, if the first information is a coordinate location (E114°42', N25°26'), the key may be a corresponding character string E11442N2526. For another example, if the first information is a text of Chinese characters, a string of pinyin symbols corresponding to the text of Chinese characters may be used as the key.

The encryption module 330 is configured to encrypt second information by using the key, to obtain encrypted information.

The second information is information that the user wants to share with a friend around, and may be, for example, a video, a recording, or a picture in a tour.

Herein, the second information is encrypted by using the key, and any existing encryption algorithm, for example, an algorithm such as a DES, a 3DES, an AES, or an RC2, may be used.

The broadcast module 340 is configured to wirelessly broadcast the encrypted information.

The broadcast module 340 may wirelessly broadcast the encrypted information by using an antenna. The antenna may be, for example, a vehicle-mounted antenna or an antenna built-in a smartphone.

In this wireless broadcast manner, the encrypted information is sent to an area around the user, and the area is related to a radiation range of the antenna. In an implementing manner, if transmit power of the antenna is adjustable, the broadcast module 340 may control a broadcast range of the encrypted information by adjusting the transmit power of the antenna.

In addition, for a receiving user of the encrypted information, to decrypt the encrypted information, in a feasible manner, the receiving user searches the social network for all possible friends or neighbors at a pre-determined quantity of hops, and generate a key according to the pre-determined key generation rule and information shared by each friend or neighbor at a pre-determined quantity of hops, to attempt to decrypt the encrypted information. This manner obviously consumes much time of the receiving user in decryption.

In an implementing manner, to improve a decryption speed of the receiving user, the broadcast module 340 is further configured to wirelessly broadcast second attribute information related to the user.

The second attribute information may be the same as the first attribute information, that is, the two may be information of a same type. However, the second attribute information is wirelessly broadcast to all receiving users directly as a plaintext, in order that a receiving user may reduce a search range on the social network according to the second attribute information.

Therefore, in an implementing manner, the second attribute information is static information of the user or static information of a mobile device of the user. The static information is information that does not change in a long time. For example, the static information may be defined as information that changes less than twice within a threshold time (for example, a month).

Specifically, the static information of the user may be, for example, information such as an ID, a nickname, or an address of the user; and the static information of the mobile device may be, for example, a brand or a model of a smartphone or a license plate number of a car.

Figure 7:
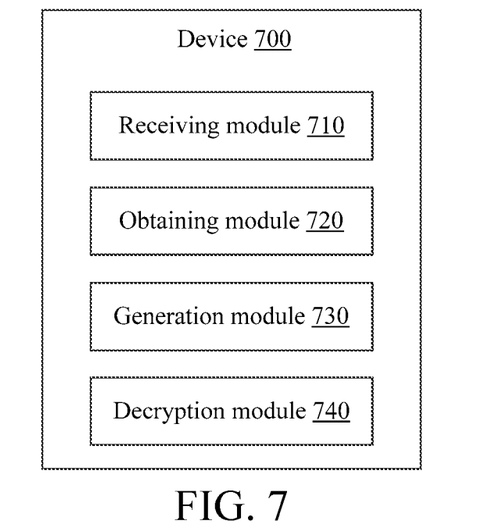
FIG. 7 is a schematic structural diagram of modules of an information processing device according to another implementing manner of the present application.

FIG. 7 is a schematic structural diagram of modules of an information processing device according to another embodiment of the present application. The information processing device may be disposed as a function module in a device such as a smartphone, a tablet computer, or a car, or may be an independent device that implements corresponding functions through communication with another electronic device. The device 700 may comprise:

a receiving module 710, configured to wirelessly receive encrypted information;

an obtaining module 720, configured to obtain first information from a social network;

a generation module 730, configured to generate a key according to the first information; and a decryption module 740, configured to decrypt the encrypted information by using the key.

According to the device in this embodiment, first, encrypted information is wirelessly received and first information is obtained from a social network; and then a key is generated according to the first information, and the encrypted information is decrypted by using the key. According to the device, among multiple receiving users, only some having an access permission, for example, a friend of a user, can obtain a corresponding key and decrypt the encrypted information. Therefore, information to be shared is conveniently and securely propagated in a corresponding geographic area between multiple close users.

Functions of the receiving module 710, the obtaining module 720, the generation module 730, and the decryption module 740 are described below in detail by using specific implementing manners.

The receiving module 710 is configured to wirelessly receive encrypted information.

Specifically, the receiving module 710 may receive the encrypted information by using an antenna. The antenna may be, for example, a vehicle-mounted antenna or an antenna built in a smartphone of a receiving user.

The obtaining module 720 is configured to obtain first information from a social network.

The obtaining module 720 may sequentially obtain, on the social network, information shared by each friend or neighbor at a pre-determined quantity of hops of the receiving user as the first information.

The first information theoretically may be any information, for example, a string of digits, a speech, or a text. In addition, considering a sharing habit of a user, in an implementing manner, the first information is first attribute information related to a user, and the user refers to a sending user.

The first attribute information may be any attribute information related to the sending user. Specifically, the first attribute information may be attribute information of the sending user, or may be attribute information of any object related to the sending user. The attribute information of the sending user may be, for example, the height, weight, or location of the sending user. The any object related to the sending user may be, for example, a car or a mobile phone of the sending user. The attribute information of the any object may be, for example, the location, brand, fuel stock or of the car.

In an implementing manner, to further improve security of the encrypted information, the first attribute information is dynamic information of the sending user or dynamic information of a mobile device of the sending user.

The dynamic information refers to status information that constantly changes within a short time. For example, the dynamic information may be defined as status information that changes more than once within a threshold time (for example, an hour).

The dynamic information of the sending user may be a mood or health data of the sending user. The mood may be, for example, joy, anger, sorrow, or happiness of the sending user. The health data may be, for example, information such as a heart rate, a pulse, an electrocardiogram, or myoelectricity.

The mobile device may be any device that can move with the sending user, for example, may be any transportation means of the user such as a vehicle, an aircraft, or a ship, or a portable electronic device of the sending user such as a smartphone, a smart tablet, or a wearable device. The dynamic information of the mobile device may be, for example, at least one of a location, a speed, and an acceleration of the mobile device.

The generation module 730 is configured to generate a key according to the first information.

The generation module 730 may generate the key according to a key generation rule the same as that of the generation module 320 in the foregoing embodiment and the first information.

The decryption module 740 is configured to decrypt the encrypted information by using the key.

The decryption module 740 may use a decryption algorithm corresponding to the encryption processing of the encryption module 330 in the foregoing embodiment. For example, if the encryption module 330 uses a DES algorithm for encryption, the decryption module 740 also uses the DES algorithm for decryption.

After the encrypted information is decrypted, original information sent by the sending user, that is, the second information in the foregoing embodiment, can be obtained.

A person skilled in the art understands that, if a receiving user receives the encrypted information only because the receiving user is around the sending user, because the receiving user is not a friend or a neighbor at a pre-determined quantity of hops of the sending user, the receiving user cannot obtain the key, and cannot decrypt the encrypted information. In other words, only a receiving user that can receive the encrypted information and obtain the key can decrypt the encrypted information.

A person skilled in the art understands that, if there is no other information, a receiving user needs to sequentially search the social network for information shared by each friend or neighbor at a pre-determined quantity of hops, and generate a key according to each piece of shared information to attempt to decrypt the encrypted information, until the decryption succeeds or all shared information is traversed. This processing manner obviously causes much operation work and consumes much time.

Therefore, in an implementing manner, the receiving module 710 is further configured to wirelessly receive second attribute information related to the user; and correspondingly, the obtaining module 720 is configured to obtain the first information from the social network according to the second attribute information.

The second attribute information may be the same as the first attribute information, that is, the two may be information of a same type. However, the second attribute information is wirelessly broadcast to all receiving users directly as a plaintext, in order that a receiving user may reduce a search range on the social network according to the second attribute information.

Therefore, in an implementing manner, the second attribute information is static information of the sending user or static information of a mobile device of the sending user. The static information is information that does not change in a long time. For example, the static information may be defined as information that changes less than twice within a threshold time (for example, a month).

Specifically, the static information of the sending user may be, for example, information such as an ID, a nickname, or an address of the user; and the static information of the mobile device may be, for example, a brand or a model of a smartphone or a license plate number of a car.

The obtaining the first information from the social network according to the second attribute information is using the second attribute information as a filtering condition, filtering out some target objects from the friend or the neighbor at a pre-determined quantity of hops of the receiving user, and then sequentially obtaining information shared by each target object. For example, assuming that the second attribute information is the ID of the sending user on the social network, a unique target object may be directly determined according to the second attribute information, and then information shared by the target object is obtained as the first information, which can obviously improve a processing speed.

In conclusion, according to the device in the present application, encrypted information wirelessly broadcast by a sending user can be received by multiple receiving users around, but only a friend or a neighbor at a pre-determined quantity of hops of the sending user can decrypt the encrypted information. Therefore, information can be securely and conveniently shared between particular users.

An application scenario of the information processing method and device in the embodiments of the present application may be as follows: Users A, B, and C are good friends, and they are friends of each other on a social network. On Sunday, A, B, and C separately drive their cars with families to visit a prairie. They drive and enjoy the beauty on the roadside. Then the user A wants to send a video shot by a vehicle-mounted camera to the users B and C. Accordingly, the user A first shares current location, speed, and acceleration information on the social network, then generates a key according to the current location, speed, and acceleration information, encrypts, by using the key, the video that the user A wants to send, and after the encryption, broadcasts the video around by using a vehicle-mounted antenna, and broadcasts a user ID of the user A on the social network as a plaintext. The cars of the users B and C are close to the car of the user A. The users B and C may receive the encrypted video and the user ID of the user A by using vehicle-mounted antennas, obtain, from the social network according to the user ID of A, the location, speed, and acceleration information shared by the user A, then generate a key, and decrypt video information by using the key, to watch content of the video.

Figure 8:
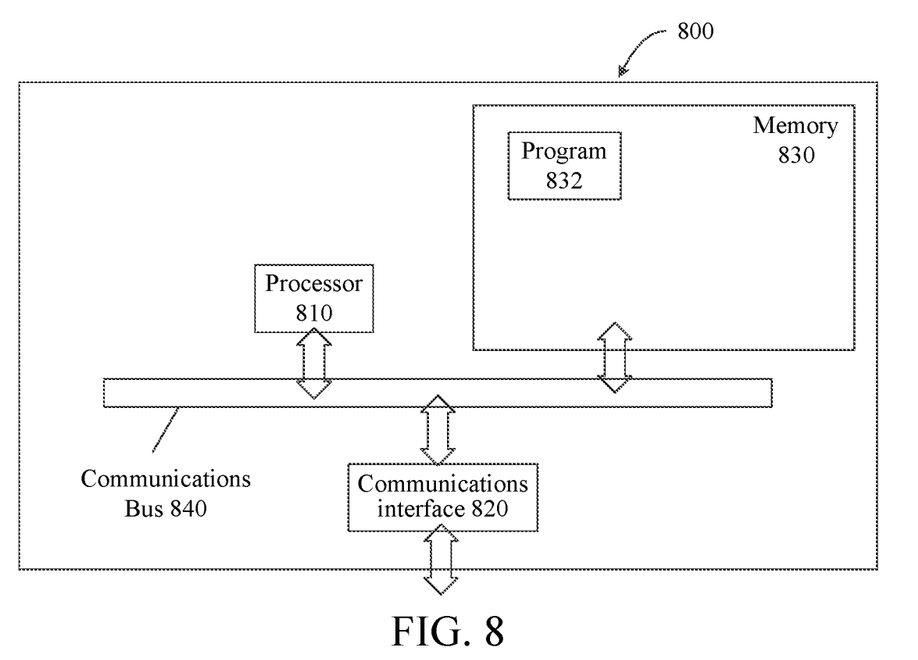
FIG. 8 is a schematic diagram of a hardware structure of a user equipment according to an embodiment of the present application.

A hardware structure of a user equipment according to an embodiment of the present application is shown in FIG. 8. Specific implementation of the user equipment is not limited in a specific embodiment of the present application. Referring to FIG. 8, the user equipment 800 may comprise:

a processor 810, a communications interface 820, a memory 830, and a communications bus 840.

The processor 810, the communications interface 820, and the memory 830 communicate with each other by using the communications bus 840.

The communications interface 820 is configured to communicate with another network element.

The processor 810 is configured to execute a program 832, and may specifically execute related steps in the method embodiment shown in FIG. 1.

Specifically, the program 832 may comprise program code, wherein the program code comprises a computer operation instruction.

The processor 810 may be a central processing unit (CPU), or an application specific integrated circuit (ASIC), or be configured into one or more integrated circuits for implementing the embodiments of the present application.

The memory 830 is configured to store the program 832. The memory 830 may comprise a high-speed random access memory (RAM), and may further comprise a non-volatile memory, for example, at least one magnetic disk storage. The program 832 may be specifically configured to execute the following steps:

sharing first information on a social network;
generating a key according to the first information;
encrypting second information by using the key, to obtain encrypted information; and
wirelessly broadcasting the encrypted information.

For specific implementation of the steps in the program 832, reference may be made to corresponding steps and modules in the foregoing embodiments, and details are not described herein again. It may be clearly understood by a person skilled in the art that, for the purpose of convenient and brief description, for specific working processes of the foregoing devices and modules, reference may be made to corresponding processes in the foregoing method embodiments, and the details are not described herein again.

Figure 9:
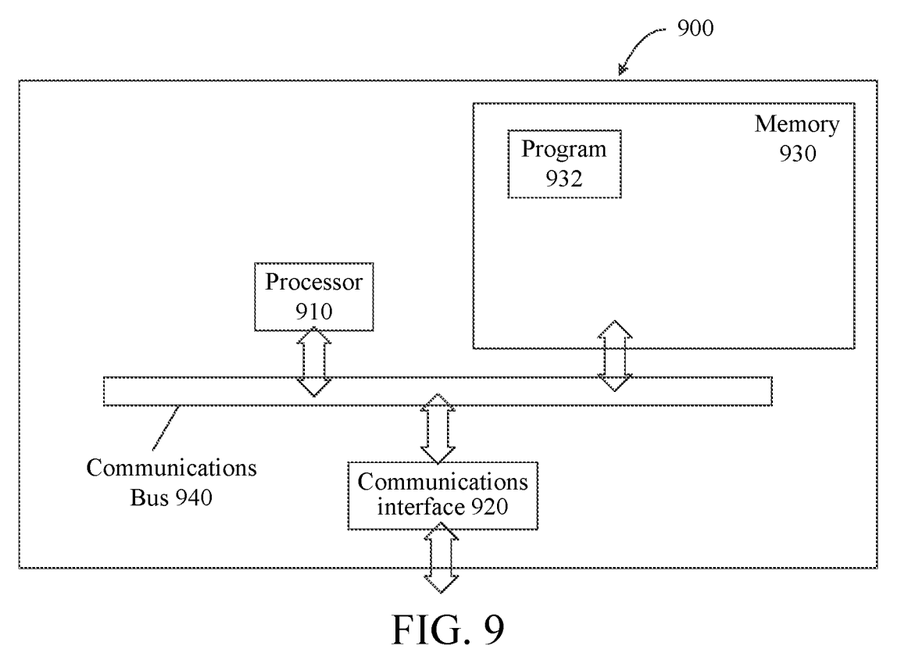
FIG. 9 is a schematic diagram of a hardware structure of a user equipment according to another embodiment of the present application.

A hardware structure of a user equipment according to an embodiment of the present application is shown in FIG. 9. Specific implementation of the user equipment is not limited in a specific embodiment of the present application. Referring to FIG. 9, the user equipment 900 may comprise:

a processor 910, a communications interface 920, a memory 930, and a communications bus 940.

The processor 910, the communications interface 920, and the memory 930 communicate with each other by using the communications bus 940.

The communications interface 920 is configured to communicate with another network element.

The processor 910 is configured to execute a program 932, and may specifically execute related steps in the method embodiment shown in FIG. 1.

Specifically, the program 932 may comprise program code, wherein the program code comprises a computer operation instruction.

The processor 910 may be a CPU, or an ASIC, or be configured into one or more integrated circuits for implementing the embodiments of the present application.

The memory 930 is configured to store the program 932. The memory 930 may comprise a high-speed RAM memory, and may further comprise a non-volatile memory, for example, at least one magnetic disk storage. The program 932 may be specifically configured to execute the following steps:

wirelessly receiving encrypted information;
obtaining first information from a social network;
generating a key according to the first information; and
decrypting the encrypted information by using the key.

For specific implementation of the steps in the program 932, reference may be made to corresponding steps and modules in the foregoing embodiments, and details are not described herein again. It may be clearly understood by a person skilled in the art that, for the purpose of convenient and brief description, for specific working processes of the foregoing devices and modules, reference may be made to corresponding processes in the foregoing method embodiments, and the details are not described herein again.

A person of ordinary skill in the art may be aware that, in combination with the examples described in the embodiments disclosed in this specification, units and method steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

When the functions are implemented in the form of a software functional unit and sold or used as an independent product, the functions may be stored in a computer-readable storage medium. Based on such an understanding, the technical solutions of the present application essentially, or the part contributing to the prior art, or a part of the technical solutions may be implemented in a form of a software product. The computer software product is stored in a storage medium, and comprises several instructions for instructing a computer device (which may be a personal computer, a controller, a network device, or the like) to perform all or a part of the steps of the methods described in the embodiments of the present application. The storage medium comprises any medium that can store program code, such as a USB flash drive, a removable hard disk, a read-only memory (ROM), a RAM, a magnetic disk, or an optical disc.

The foregoing implementing manners are merely intended to describe the present application rather than limit the present application. A person of ordinary skill in the art may make modifications and variations without departing from the spirit and scope of the present application. Therefore, all equivalent technical solutions shall also fall within the scope of the present application, and the patent protection scope of the present application shall be subject to the claims.

What is claimed is:

1. An information processing method to share media content, implemented on a user device that accesses a social network system using a social network user ID, wherein the method comprises: sharing, on a social network page for the social network user ID, first information, wherein the shared first information is accessible to a friend or a neighbor at a pre-determined quantity of hops on the social network; generating, by the user device, a key according to the first information; encrypting, by the user device, the media content by using the key, to obtain an encrypted media content; and wirelessly broadcasting the social network user ID and the encrypted media content, such that the social network page is accessible to a receiving device of the encrypted media content to obtain the shared first information.

2. The method of claim 1, further comprising: obtaining first attribute information related to a user as the first information.

3. The method of claim 2, wherein the first attribute information is dynamic information of the user or dynamic information of a mobile device of the user; and the method further comprises: updating the first attribute information on the social network after a pre-determined time.

4. The method of claim 3, wherein the dynamic information of the user comprises a mood or health data of the user.

5. The method of claim 3, wherein the mobile device comprises a transportation means or a portable electronic device.

6. The method of claim 3, wherein the dynamic information of the mobile device comprises at least one of a location, a speed, or an acceleration of the mobile device.

7. The method of claim 1, further comprising: setting an access permission of the first information on the social network.

8. An information processing method, implemented on a device that accesses a social network system using a first user ID, for obtaining media content shared by an electronic device, wherein the method comprises: wirelessly receiving a second social network user ID and an encrypted media content from the electronic device; accessing, in the social network, a page for the second social network user ID, obtaining, from the page, first information shared by the electronic device, wherein the first information is accessible to a friend or a neighbor at a pre-determined quantity of hops on the social network; generating a key according to the first information; and decrypting the encrypted media content by using the key.

9. The method of claim 8, wherein the first information is first attribute information related to a user.

10. The method of claim 9, wherein the first attribute information is dynamic information of the user or dynamic information of a mobile device of the user.

11. The method of claim 10, wherein the dynamic information of the user comprises a mood or health data of the user.

12. The method of claim 10, wherein the mobile device comprises a transportation means or a portable electronic device.

13. The method of claim 10, wherein the dynamic information of the mobile device comprises at least one of a location, a speed, or an acceleration of the mobile device.

14. An information processing device to share media content, implemented on a user device that accesses a social network system using a social network user ID, wherein the device comprises: a sharing module, configured to share, on a social network page for the social network user ID, first information, wherein the first information is accessible to a friend or a neighbor at a pre-determined quantity of hops on the social network; a generation module, configured to generate, by the user device, a key according to the first information; an encryption module, configured to encrypt, by the user device, the media content by using the key, to obtain an encrypted media content; and a broadcast module, configured to wirelessly broadcast the social network user ID and the encrypted media content, such that the social network page is accessible to a receiving device of the encrypted media content to obtain the shared first information.

15. The device of claim 14, further comprising: an obtaining module, configured to obtain first attribute information related to a user as the first information.

16. The device of claim 15, wherein the first attribute information is dynamic information of the user or dynamic information of a mobile device of the user; and the device further comprises: an update module, configured to update the first attribute information on the social network after a pre-determined time.

17. The device of claim 14, wherein the device further comprises: a setting module, configured to set an access permission of the first information on the social network.

18. An information processing device, implemented on a device that accesses a social network system using a first user ID, for obtaining media content shared by an electronic device, wherein the device comprises: a receiving module, configured to wirelessly receive a second social network user ID and an encrypted media content from the electronic device; an obtaining module, configured to access, in the social network, a page for the second social network user ID and obtain, from the page, first information shared by the electronic device; a generation module, configured to generate a key according to the social message; and a decryption module, configured to decrypt the encrypted media content by using the key.

19. A user equipment, wherein the user equipment comprises the information processing device according to claim 14.

20. A user equipment to share media content, wherein the user equipment comprises: a memory, configured to store an instruction; and a processor, configured to execute the instruction stored in the memory, wherein the user equipment accesses a social network system using a social network user ID, the instruction causes the processor to execute operations including: sharing, on a social network page for the social network user ID, first information, wherein the first information is accessible to a friend or a neighbor at a pre-determined quantity of hops on the social network; generating, by the user device, a key according to the first information; encrypting, by the user device, the media content by using the key, to obtain an encrypted media content; and wirelessly broadcasting the social network user ID and the encrypted media content, such that the social network page is accessible to a receiving device of the encrypted media content to obtain the shared first information.

21. A user equipment to obtain media content shared by another user equipment, comprising: a memory, configured to store an instruction; and a processor, configured to execute the instruction stored in the memory, wherein the user equipment accesses a social network system using a first user ID, the instruction causes the processor to execute operations including: wirelessly receiving a second social network user ID and an encrypted media content from the another user equipment; accessing, in the social network, a page for the second social network user ID, obtaining, from the page, first information shared by the another user equipment, wherein the first information is accessible to a friend or a neighbor at a pre-determined quantity of hops on the social network; generating a key according to the first information; and decrypting the encrypted media content by using the key.

* * * * *